United States Patent

Sakaue et al.

[11] Patent Number: 5,831,657
[45] Date of Patent: Nov. 3, 1998

[54] IMAGE FORMING SYSTEM WITH SMOOTHING PIXELS OF A LARGER SIZE

[75] Inventors: Eiichi Sakaue, Urayasu; Masafumi Mori, Tokyo, both of Japan

[73] Assignee: Kabushiki Kaisha Toshiba, Kawasaki, Japan

[21] Appl. No.: 808,836

[22] Filed: Feb. 28, 1997

Related U.S. Application Data

[63] Continuation of Ser. No. 308,429, Sep. 19, 1994, abandoned.

[30] Foreign Application Priority Data

Sep. 22, 1993 [JP] Japan ................................ 5-259354

[51] Int. Cl.⁶ ........................................................ B41J 2/47
[52] U.S. Cl. .......................... 347/131; 347/136; 358/298
[58] Field of Search ................................... 347/135, 136, 347/131, 240, 257, 252, 254, 253; 358/296, 298

[56] References Cited

U.S. PATENT DOCUMENTS

| | | |
|---|---|---|
| 4,625,222 | 11/1986 | Bassetti et al. . |
| 4,692,779 | 9/1987 | Ando et al. .............................. 347/127 |
| 4,847,641 | 7/1989 | Tung . |
| 5,134,494 | 7/1992 | Frazier et al. .......................... 358/298 |
| 5,134,495 | 7/1992 | Frazier et al. . |
| 5,396,584 | 3/1995 | Lee et al. ................................. 395/132 |
| 5,450,208 | 9/1995 | Murata .................................... 358/296 |

*Primary Examiner*—Mark J. Reinhart
*Attorney, Agent, or Firm*—Oblon, Spivak, McClelland, Maier & Neustadt, P.C.

[57] ABSTRACT

An image forming apparatus according to the present invention comprises image forming unit for forming an image from a plurality of first pixels having a predetermined size, and smoothing processing unit for executing a smoothing process by controlling the image forming unit so that picture elements situated near the outline of the image formed by unit of the image forming unit are composed of second pixels having a size larger than that of the first pixels.

22 Claims, 11 Drawing Sheets

FIG. 1 (PRIOR ART) — SMOOTHING OFF

FIG. 4 — SMOOTHING ON

(INTENSITY DATA = 5)    CENTER CELL

IMAGE FORMING SYSTEM WITH SMOOTHING PIXELS OF A LARGER SIZE

This application is a Continuation of application Ser. No. 08/308,429, filed on Sep. 19, 1994, now abandoned.

BACKGROUND OF THE INVENTION

1. Field of the Invention

This invention relate to a printing apparatus such as an electrographic apparatus and more specifically relates to enhancing a print image by a smoothing technique.

2. Description of the Related Art

In the fields of copying machines and printers, a smoothing (anti-aliasing) process is used to improve the appearance of the output image.

Figure 1:
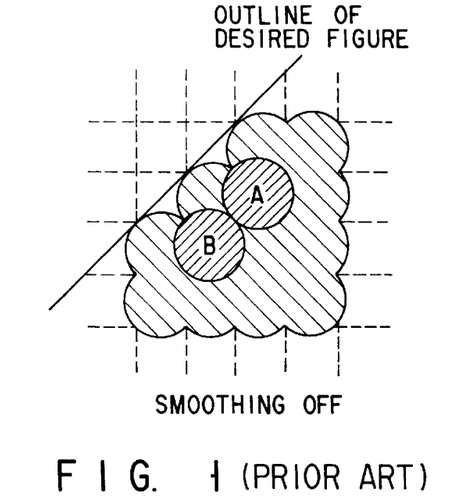
FIG. 1 is a diagram showing an output result obtained when no smoothing process is executed.
Figure 2:
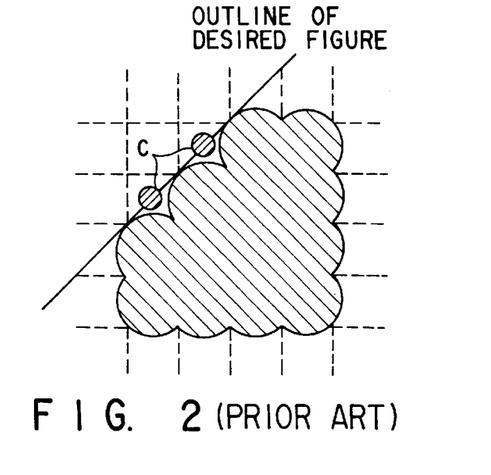
FIG. 2 is a diagram showing an output result obtained according to a conventional smoothing process.

In the smoothing process, sizes of dots and/or positions thereof corresponding to indentations (called aliases) of the outline portion of a figure, as shown in FIG. 1, are modulated or a gray dot is formed, whereby an output image is visually smoothed, as shown in FIG. 2. Generally, in an electrophotographic recording apparatus such as a laser beam printer, a method of modulating dots can be performed by two methods. According to one method, these dots are formed by reducing the pulse width or the time during which cells (or pixels) at which dots are formed, are irradiated inside. In the other method, the laser intensity is lowered to reduce the exposure to light.

In the laser beam printer, however, formation of smaller size dots or gray dots is unstable against external and internal environments. In some cases, the halftone is outputted with a higher density than expected, or in extreme cases, its pixels cannot be formed at all, depending on the change of the environments. Moreover, it is hard to keep the dots small enough. Accordingly, the smoothing process may fail to be executed, and the output image may be disturbed. This may be attributable to the nature of the electrophotographic process as a recording system for the laser beam printer.

Figure 3:
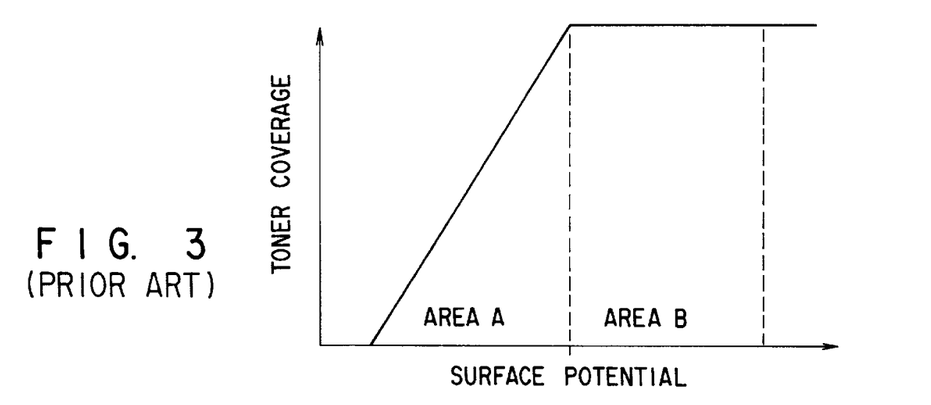
FIG. 3 shows a characteristic curve representing the relationship between the surface potential and toner coverage on a photosensitive drum.

In the electrophotographic process, that portion of the previously uniformly charged surface of a photosensitive drum on which pixels are to be deposited is exposed. The exposed portion of the drum surface releases its surface charge, so that its surface potential drops. The pixels are formed as the charged toner adheres to the portion with the lowered potential. The instability of the gray dot or small dot formation depends on the relationship between the surface potential and the toner coverage. In a halftone area, as shown in FIG. 3, the toner coverage tends to change drastically with a minor change of the surface potential. Generally, this phenomenon is believed to indicate a high gamma value. Owing to this phenomenon, the laser light quantity varies, so that the toner may fail to adhere, its density may increase unexpectedly, or the dot size may become larger. Thus, the outline of the output image cannot be represented smoothly.

SUMMARY OF THE INVENTION

The object of the present invention is to provide an image forming apparatus and an electrophotographic recording apparatus capable of carrying out stable smoothing processing without the influence of the instability of an electrophotographic process or the like.

An image forming apparatus according to the present invention is characterized by comprising: image forming means for forming an image from a plurality of first pixels each having a predetermined size; and smoothing processing means for executing a smoothing process by controlling the image forming means so that picture elements situated near the outline of the image formed by means of the image forming means are composed of second pixels having a size larger than that of the first pixels. With this configuration, the image forming means includes means for forming one of the first and second pixels by means of a laser beam, and the smoothing processing means includes means for forming the second pixels by increasing the light quantity and/or modulating irradiation time for the laser beam as compared with the formation of the first pixels.

With the above configuration, the forming apparatus according to the invention has the following preferable manner.

(1) The smoothing processing means increases the light quantity of the laser beam by controlling the driving current of a laser for emitting the laser beam.

(2) The smoothing processing means includes transmission quantity control means for controlling the quantity of transmission of the laser beam. The smoothing processing means further includes transmission quantity control means for controlling the quantity of transmission of the laser beam.

(3) The transmission quantity control means includes a liquid crystal shutter.

(4) The smoothing processing means includes means for controlling the image forming means to form the second pixels having a plurality of sizes larger than that of the first pixels.

(5) The smoothing processing means includes a template pattern for matching with a bit map pattern of the image and means for outputting a smoothing signal when the template pattern is detected in the bit map pattern. Further, the smoothing processing means includes means for storing desired template patterns synthesized by a predetermined process and smoothing data corresponding to each of the desired template pattern for performing smoothing process of each of the desired template pattern. In addition, the smoothing processing means further includes template pattern designing means for designing the template pattern, and the template pattern designing means includes means for designing a desired template pattern, means for extracting the outline of the desired template pattern, means for calculating the shortest distance from a interest pixel in the desired template pattern to the outline and an angle of inclination to a predetermined direction, and means for obtaining smoothing data on the basis of the shortest distance and the angle.

(6) The smoothing processing means includes means for extracting outline pixels of an inputted binary image and synthesizing the outline of the image in accordance with the outline pixels, means for calculating the shortest distance from a predetermined pixel out of the binary pixels to the outline and an angle between the predetermined angle and a line connecting the predetermined pixel and the outline at the shortest distance, and smoothing data generating means for generating smoothing data on the basis of the shortest distance and the angle. Further, the smoothing data generating means includes laser beam intensity modulation data generating means for generating laser beam intensity modulation data for smoothing by intensity modulation of the laser beam, pulse dividing pattern data generating means for generating pulse dividing pattern data for smoothing by pulse division, distance comparing means for comparing the shortest distance with a pixel density, and smoothing data selecting means for selecting the laser beam intensity modulation data generating means in a case that the distance comparing means determines that the shortest distance is larger than the pixel density, and for selecting the pulse dividing pattern data generating means in a case that the distance comparing means determines that the shortest distance is smaller than the pixel density. The pulse dividing pattern data generating means includes means for determining a total pulse width in a pixel on the basis of the shortest distance, and means for selecting a pulse dividing pattern among a plurality of pulse dividing patterns on the basis of the angle. In addition, the pulse dividing pattern includes five kind of patterns of uniform dividing pattern, right shifting pattern, left shifting pattern, center-to-right shifting pattern and center-to-left shifting pattern, and the pulse dividing pattern data generating means includes means for selecting one of the uniform dividing pattern in a case that the angle is more than 60 degree and less than 120 degree, or more than 240 degree and less than 300 degree, the right shifting pattern in a case that the angle is more than 0 degree and less than 30 degree, or more than 330 degree and less than 360 degree, the left shifting pattern the angle is more than 150 degree and less than 210 degree, the center-to-right shifting pattern the angle is more than 30 degree and less than 60 degree, or more than 300 degree and less than 330 degree, and the center-to-left shifting pattern the angle is more than 120 degree and less than 150 degree, or more than 210 degree and less than 240 degree. The pulse dividing pattern data generating means includes lookup table which is referred to output a divided pattern on the basis of the shortest distance and the angle. The smoothing data generating means includes for outputting a smoothing data in reference to a lookup table on the basis of the shortest distance and the angle.

An image forming method according to the invention is characterized by comprising the steps of a first step of forming an image from a plurality of first pixels each having a predetermined size; and a second step of executing a smoothing process by controlling the image forming means so that picture elements situated near or on the outline of the image formed by means of the image forming means are composed of second pixels having a size larger than that of the first pixels. The second step includes the substeps of: extracting outline pixels of an inputted binary image and synthesizing the outline of the image in accordance with the outline pixels, calculating the shortest distance from a predetermined pixel out of the binary pixels to the outline and an angle between the predetermined angle and a line connecting the predetermined pixel and the outline at the shortest distance, and generating smoothing data on the basis of the shortest distance and the angle. Further, the second step includes the substeps of: designing a desired template pattern, extracting the outline of the desired template pattern, calculating the shortest distance from a interest pixel in the desired template pattern to the outline and an angle of inclination to a predetermined direction, obtaining smoothing data on the basis of the shortest distance and the angle, and storing desired template patterns synthesized by a predetermined process and smoothing data corresponding to each of the desired template pattern for performing smoothing process of each of the desired template pattern.

An electrophotographic recording apparatus according to the invention is characterized by comprising: a photosensitive drum; record means for recording an image thereon; charging means for uniformly charging the photosensitive drum; image forming means for forming an electrostatic latent image from first pixels having a predetermined size on the uniformly charged photosensitive drum; smoothing processing means for executing a smoothing process such that picture elements situated near the outline of the electrostatic latent image formed by means of the image forming means are composed of second pixels having a size larger than that of the first pixels; developing means for developing the smoothed electrostatic latent image to form a predetermined image; transfer means for transferring the image to the record means; and fixing means for fixing the transferred image on the record means.

Preferable manners of the electrophotographic recording apparatus are as follows.

(1) The image forming means includes means for forming at least one of the first and second pixels by means of a laser beam, and the smoothing processing means includes means for forming the second pixels by increasing one of the light quantity and irradiation time for the laser beam as compared with the formation of the first pixels.

(2) The smoothing processing means includes means for controlling the image forming means to form the second pixels having a plurality of sizes larger than that of the first pixels.

(3) The smoothing processing means includes at least one template pattern for matching with a bit map pattern of the image and means for outputting a smoothing signal when the template pattern is detected in the bit map pattern.

If the image forming means is based on the electrophotographic system in which the electrostatic latent image is formed on the surface of the photosensitive drum by means of the laser beam, for example, the second pixels which are larger than the first pixels are formed by subjecting the laser beam to light intensity modulation by means of a light modulator, thereby outputting a higher-intensity beam.

In the case where a semiconductor laser is used as a laser light source, the second pixels larger than the first pixels are formed by controlling a current injected into the laser to effect the light intensity modulation, thereby outputting a higher-intensity laser beam. A semiconductor laser control device is used for the light intensity modulation of the laser beam from the semiconductor laser. This control device includes, for example, a current driving circuit connected to the semiconductor laser, a light detector, such as a photodiode, for monitoring part of the output light from the laser and generating a monitor current, and an operational amplifier. The amplifier receives at its inverting input an intensity modulating signal fed through a resistor and a feedback current based on the monitor current, and receives a reference signal at its noninverting input. When the quantity of light emitted from the semiconductor laser varies, the operational amplifier generates an error signal in response to the feedback current, and applies it to the current driving circuit, thereby compensating the variation of the laser light quantity.

According to the present invention, the outline portion is smoothed in a manner such that dots of the pixels inside of the outline is formed by forming the second pixels larger than the first pixels of the normal size to form the outline instead of by making only the size of dots on the outline of the image smaller than the first pixel having normal size or making the image gray level. As compared with the case of formation of unstable halftone pixels which are smaller than normal ones, therefore, a reliable smoothing effect can be obtained without involving the instability of the electrophotographic process, in particular.

In the electrophotographic process according to the invention, for example, stable smoothing processing can be enjoyed by increasing the size of the pixels in specific positions at the outline portion, if necessary, in consideration of the fact that formation of larger pixels ensures stabler recording than fine pixel forming.

In the present invention, since smoothing signals, which smoothly record the outline of the image, is calculated by a distance between an interest pixel and the shortest distance to the outline therefrom and the angle therebetween, the smoothing signal for making small the dots of the pixels on the outline and/or enlarging the dots of pixels inside of the outline can be early and easily obtained.

In the case where the pixel size is varied by modulating the intensity of the laser beam emitted from the semiconductor laser, reliable laser beam intensity modulation can be secured by continually monitoring the laser beam intensity. Thus, the pixel size can be modulated with stability.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE PREFERRED EMBODIMENTS

Preferred embodiments of the present invention will now be described with reference to the accompanying drawings.

Although the present invention is applied to electrophotographic printers, such as laser beam printers, according to these embodiments, it may be also applied to thermal ink jet printers, solid-state head printers, and other dot matrix printers, and besides, to CRT displays and liquid crystal displays.

Figure 4:
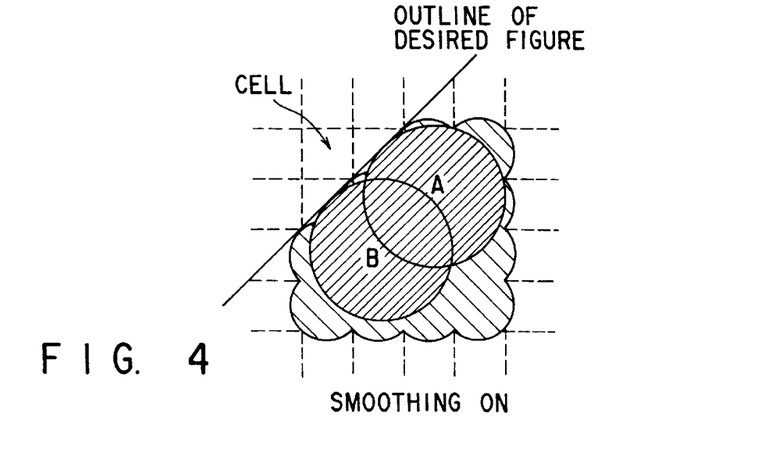
FIG. 4 is a diagram showing an example of an output image smoothed according to the present invention.

Referring now to FIG. 4, an outline of the present invention will be described. FIG. 4 is a diagram showing an example of an output image smoothed according to the present invention.

In prior art dot matrix printers, such as laser beam printers, a desired character or figure is formed from a set of dots (i.e., pixels) in the form of a lattice which is composed of horizontal rows and vertical columns arranged at regular intervals, as shown in FIG. 1. A typical dot matrix printer can form dots of a fixed size only. According to the printer of this type, the respective shapes of the individual dots are so conspicuous, as shown in FIG. 1, that the outline of a binary image, such as the desired character or figure, cannot be represented smoothly.

According to the present invention, the outline of the desired figure or character can be represented smoothly by forming on a record medium those dots (second pixels) which are made larger than ordinary dots (first pixels), if necessary.

The dot size can be enlarged by increasing the intensity of a laser beam or light quantity. A control signal for increasing the laser beam intensity is settled by collating bit map data with a template pattern and modifying data for a watched cell when they are coincident.

The following is a description of an outline of an image forming apparatus (laser printer in the case of the subsequent embodiments) according to a first embodiment of the present invention.

Figure 5:
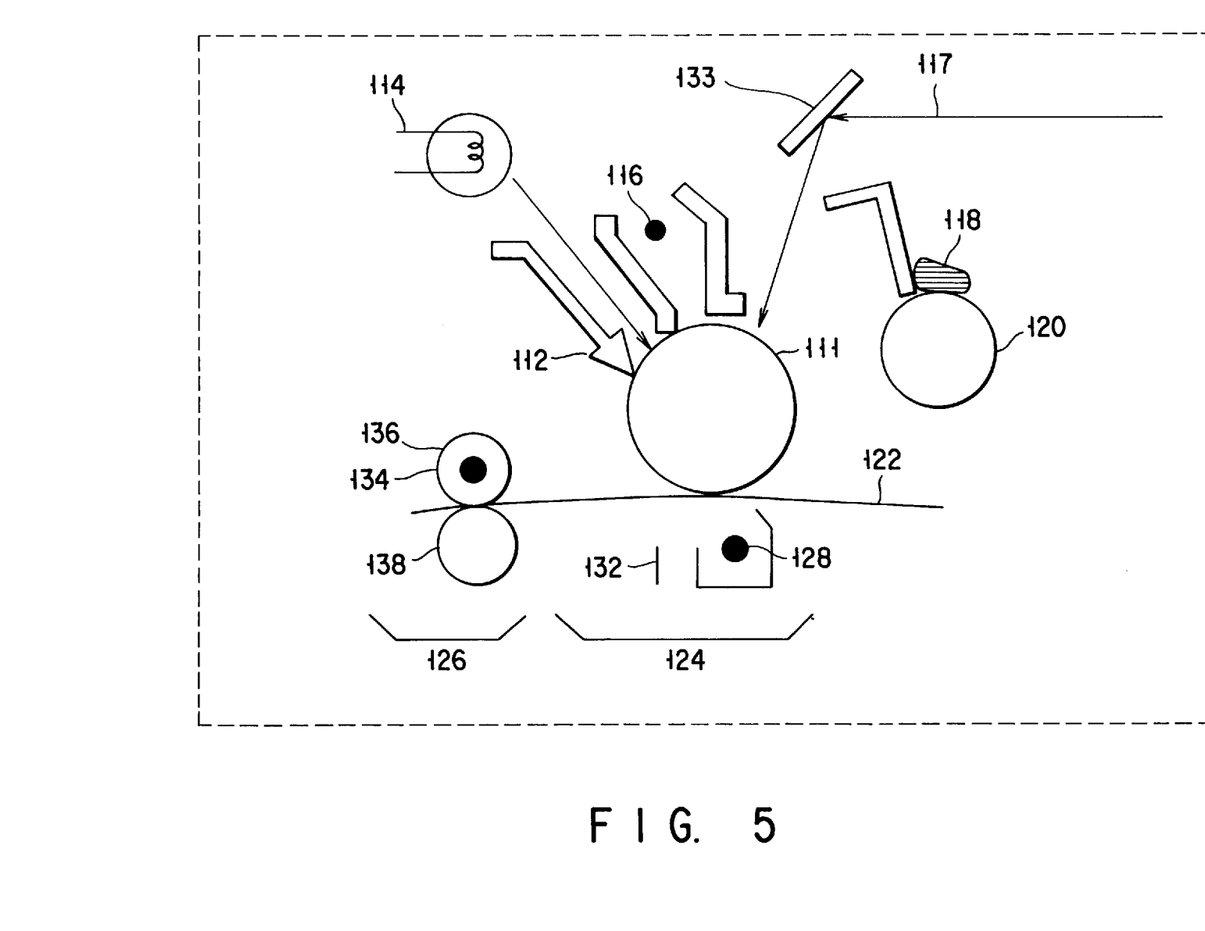
FIG. 5 is a diagram showing an outline of an image forming apparatus according to a first embodiment of the invention.

FIG. 5 shows a recording section of a typical electrophotographic laser beam printer.

The recording section of the laser beam printer is composed mainly of devices for five processes, including a charging section, light exposure section, developing section, transfer section, and fixing section.

Figure 6:
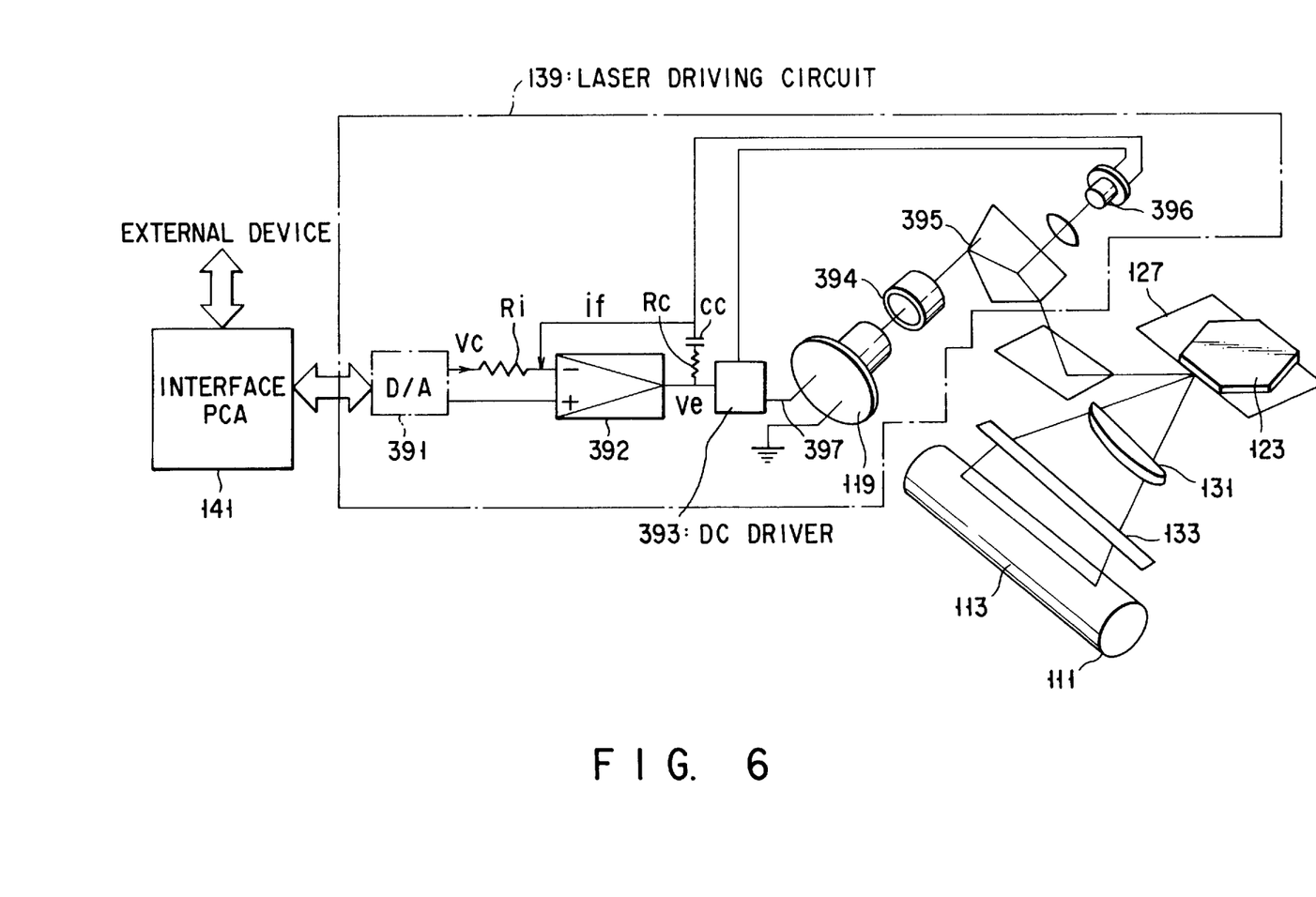
FIG. 6 is a diagram showing a laser scanning section and a laser driving circuit according to the first embodiment.

FIG. 6 is a diagram showing a circuit section for electrically controlling the recording section of the electrophotographic laser beam printer according to the present embodiment and part of the light exposure section.

In general, a photosensitive drum 111 is a metallic cylinder coated with a layer of an organic photoconductive material. The inside of the cylinder is electrically grounded.

A cleaning blade 112 scrapes off the remainder of a toner lot used in the preceding cycle from the drum 111 into a waste cavity (not shown), thereby cleaning the surface of the drum. An erasing lamp 114 irradiates the surface 113 of the photosensitive drum 111, thereby removing existing electric charges from the drum 111 so that the surface 113 is electrically neutralized. As the drum 111 rotates, negative charges from a charge corona generator 116 of the charging section move onto the drum surface 113. As a result, the drum surface 113 has a uniform negative potential.

A laser beam 117 is generated by means of a semiconductor laser 119. The on-off operation and light intensity modulation of the laser beam 117 are carried out by controlling a laser driving current 397 flowing through the laser 119. The laser beam 117 is converged on a scanning mirror (polygon mirror) 123 by means of a collimating lens 394. The mirror 123 is a polygon mirror which is rotated at constant speed by means of a motor 127, whereby the photosensitive drum 111 is scanned with the laser beam 117.

The laser beam 117 is focused on a horizontal line on the surface 113 of the photosensitive drum 111 by means of a condensing lens 131 and a mirror 133. The drum surface 113 is scanned with and exposed to the laser beam 117 as the drum 111 rotates with the beam 117 deflected by the rotation of the scanning mirror 123. Since the laser beam 117 is subjected to the on-off operation and light intensity modulation by controlling the laser driving current 397, moreover, a set of exposure spots can be formed as a pattern over the whole photosensitive drum surface 113. In the description to follow, the direction of scanning with the laser beam 117 will be referred to as the main scanning direction, and the rotating direction of photosensitive drum 111 as the sub-scanning direction. The pitch (i.e., resolution) of the exposure spots in the main scanning direction is settled depending on the on/off timing of the laser and the speed of main scanning with the laser beam 117. The resolution in the sub-scanning direction depends on the main scanning time and the rotating direction of the drum 111. The lens 131 serves to fix the speed of movement of beam spots on the drum 111.

When optical loading of the photosensitive drum 111 with the laser beam 117 is finished, an electrostatic latent image is formed on the surface 113 of the drum 111. More specifically, the potential at the time of charging remains entire on that portion of the drum surface 113 which has not been irradiated with the laser beam 117, and the potential of the irradiated portion becomes lower than the charging potential, whereby the latent image is formed.

In the developing section, a developing agent or toner is put on the electrostatic latent image. The material of the toner is a powdery material formed of a black synthetic resin bonded to iron particles. The toner, containing iron, is attracted to a metallic rotating cylinder 120 with a permanent magnet (not shown) which extends throughout the length of the cylinder. Plastic toner particles 118 obtain negative surface charges by being smeared on the cylinder 120 which is connected to a negative DC power source. The electrostatic charges obtained by the toner are ones such that the toner particles are attracted to that region of the photosensitive drum surface 113 which is exposed to the laser beam, but are repulsed by the unexposed surface region.

In the transfer section 124, a toner image on the photosensitive drum surface 113 is transferred to a printing paper 122 for use as the record medium. A corona assembly 128 generates positive charges which accumulate on the reverse side of the paper 122. As the positive charges on the paper are enhanced, the negatively charged toner particles 118 are separated from the drum surface 113. An electrostatic charge remover 132 attenuates a force of attraction between the drum surface 113 having the negative charges and the printing paper 122 having the positive charges, thereby preventing the paper 122 from winding around the photosensitive drum 111.

In the fixing section 126, the toner is fused by heat under pressure, and is fixed on the printing paper 122. The paper 122, having the toner thereon, is held between a soft pressurizing roller 138 and a noncohesive heating roller 134, which is heated inside by means of a high-luminance lamp 136. Then, the toner on the paper 122 is fused and forced into spaces between the fibers of the paper.

Figure 7:
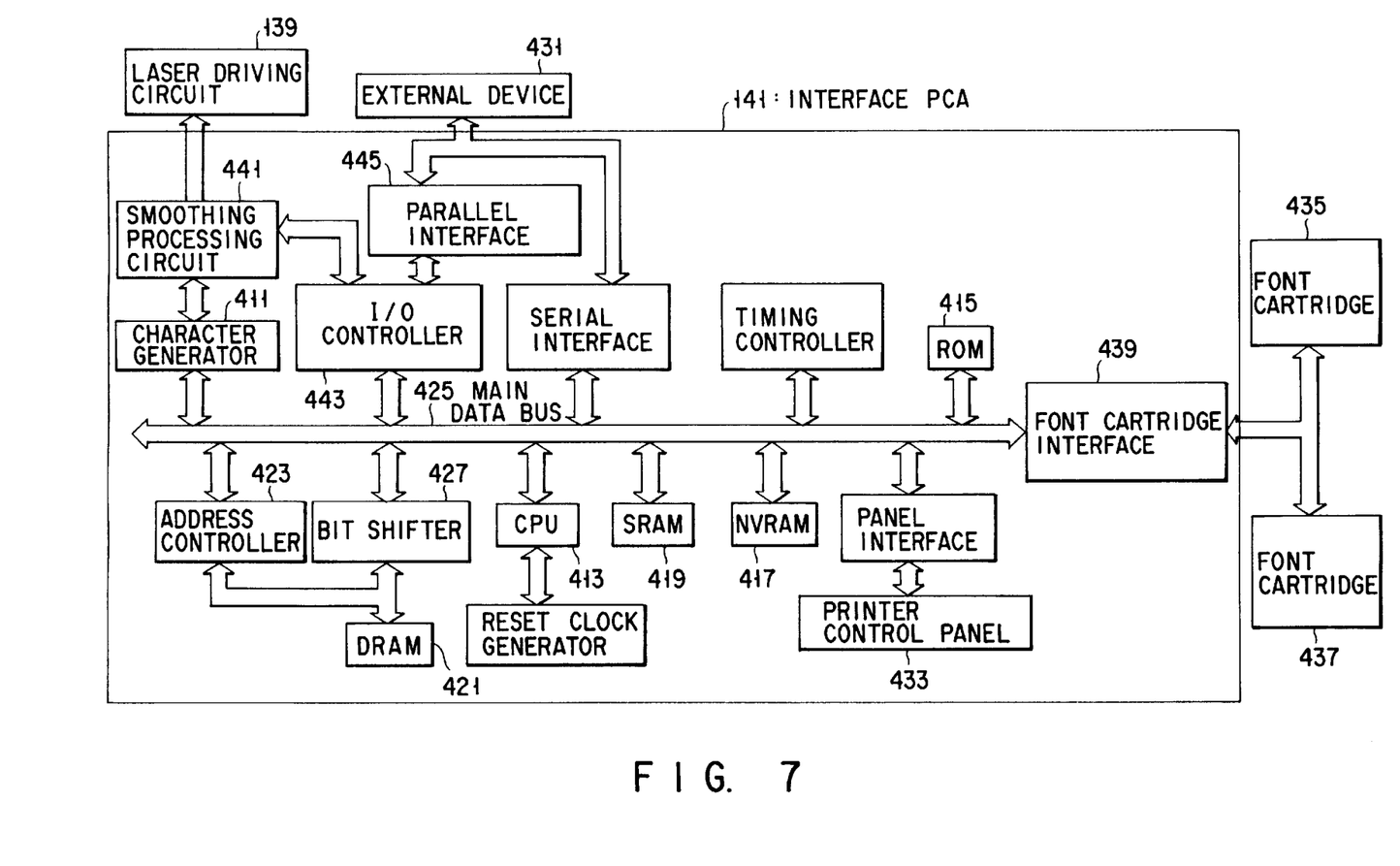
FIG. 7 is a block diagram showing an outline of an interface section and a light exposure section according to the first embodiment.

FIG. 7 is a diagram showing an outline of an interface PCA 141 of a circuit section for controlling the laser printer of FIG. 6 including a conventional smoothing processing circuit.

A character generator 411 generates a serial data signal to provide the desired character or figure, and supplies it to a laser driving circuit 139 of a DC controller PCA, thereby modulating the laser.

The interface PCA 141 is controlled by means of a CPU 413 formed of a 16-bit microprocessor, which executes programs stored in a ROM 415. The ROM 415 is stored with microprocessor controller programs to be executed by the microprocessor.

Font cartridges 435 and 437 are each composed of a plug-in ROM cartridge which supplies dot pattern data of an additional character set for various optional fonts to the printer. A font cartridge interface 439 buffers the respective connectors of the cartridges 435 and 437 to a main data bus 425.

A nonvolatile RAM (NVRAM) 417 is provided for storing primary data, such as print data inputted through a printer control panel 433, page count information, etc. A static RAM (SRAM) 419 adds an address space for the microprocessor in the CPU 413.

An address controller 423 delivers address information for access to data stored in four independent sections of the ROM 415. The controller 423 is realized as a single gate array circuit.

An extendible dynamic RAM (DRAM) 421 is provided for storing print information, font information, and other information inputted from an external device 431. A bit shifter 427 generates a command required in further shifting the data by 1 to 15 bits, in order to offset or overlay printed characters in response to a command from the printer control panel 433 or the external device 431.

An I/O controller 433 controls the timing for data delivered from the external device 413 to the CPU 413 through a parallel interface connector 445. The I/O controller 443 also controls the timing for communication between the interface PCA 141 and the DC controller PCA. In response to a command from the CPU 413, the character generator 411 converts bit map image data stored in the ROM or the font cartridges 435 and 437 into dot data which are successively delivered in the form of serial data signals to the laser driving circuit (semiconductor laser control device) 139.

A smoothing processing circuit 441 for higher print quality based on the present invention is inserted between the character generator 411 and the laser driving circuit 139, in order to correct or compensate the series data signals so that a technique for improving the print quality can be realized.

After describing the prior art in detail again with reference to FIGS. 1 to 3, smoothing processing according to the present invention will be described.

In the dot matrix printers, such as laser beam printers, the desired character or figure is formed from a set of dots (i.e., pixels) in the form of a lattice which is composed of horizontal rows and vertical columns arranged at regular intervals, as shown in FIG. 1. Each lattice element is called a cell, which represents the position of a dot. Thus, each dot is a filled cell, and each blank is an empty cell. In general, the fullness or emptiness of the dot is represented by a binary number. For example, the binary number "1" represents a dot (or filled cell), and "0" represents a blank (or empty cell).

In the case of the conventional printer which can form only a uniform dot for each cell, as shown in FIG. 1, the respective shapes of the individual dots which constitute the figure are so conspicuous that the outline cannot be represented smoothly.

Accordingly, there is a technique such that the outline of a set of dots is made smooth as required by assigning a gray-level dot or small dot to each cell, as mentioned before. This is also called a smoothing technique or anti-aliasing technique.

FIG. 2 is a diagram for illustrating the smoothing technique. In general, a gray-level dot is created by reducing the time (i.e., pulse width) during which the laser is on in a cell or the light quantity of a laser beam, thereby reducing the size of a dot formed in the cell. However, recording of a gray scale is very unstable against external and internal environments. In some cases, the gray scale is outputted with a very high density, or its pixels cannot be formed at all, depending on the change of the environments. Thus, the smoothing process may fail to be executed, and the output image may be disturbed. This may be attributable to the nature of the electrophotographic process as a recording system for the laser beam printer. In the electrophotographic process, that portion of the previously uniformly charged photosensitive drum surface 113 on which pixels are to be deposited is exposed. The exposed portion of the drum surface 113 releases its surface charge, so that its surface potential drops. The pixels are formed as the charged toner adheres to the portion with the lowered potential. The instability of the gray scale depends on the relationship between the surface potential and the toner coverage.

FIG. 3 is a graph showing the relationship between the surface potential and the toner coverage. On the level of the gray scale, as represented by an area A in FIG. 3, the toner coverage tends to change drastically with a minor change of the surface potential. Generally, this phenomenon is believed to indicate a high gamma value. If the laser beam quantity is lessened or increased by the smallest margin, therefore, the toner may fail to adhere, its density may increase unexpectedly, or the dot size may become larger. Thus, the outline of the output figure cannot be represented smoothly.

Figure 8:
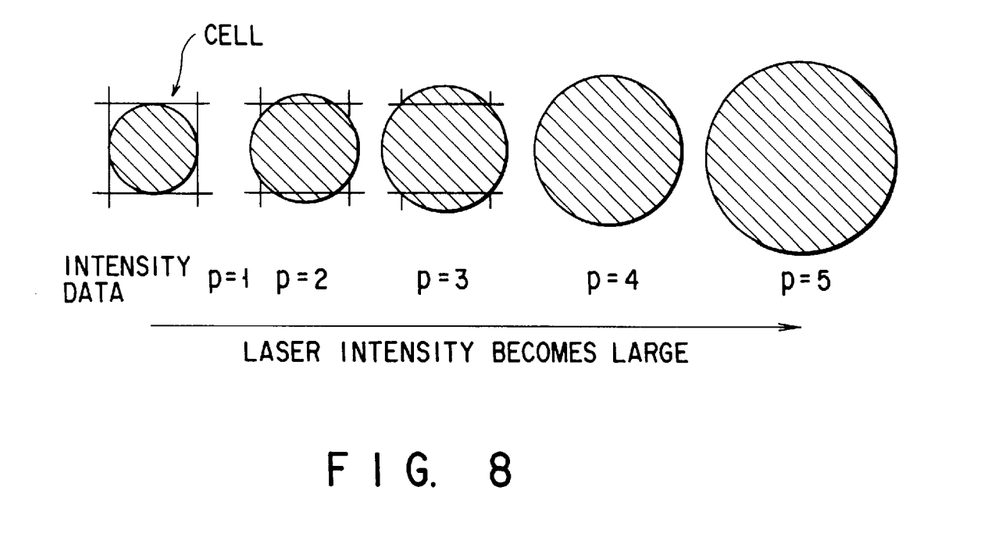
FIG. 8 shows the relationships between laser beam intensity modulating signals and dots.

FIG. 8 shows dots which are formed when beam irradiation is carried out with the intensity of the laser beam changed. As the light intensity increases, the dot sizes become larger. It is safer to control the dot size by increasing the light quantity than to record smaller dots by reducing the light quantity. This is because increasing the light quantity widens an area B of FIG. 8 which is stable. Recording small dots, on the other hand, increases the percentage of the area A in the pixel, so that the variation of the light quantity inevitably exerts a great influence.

According to the present invention, a smoothing process, such as the one shown in FIG. 4, is executed by arranging dots larger than the conventional dots as required in the cells, as in the cases of intensity data p=4 and p=5 shown in FIG. 8.

As described above, the smoothing process according to the present invention is executed by modulating the laser beam irradiation time (i.e., pulse width) for each cell or laser beam intensity. In the case of a printer which does not perform the smoothing operation, it is necessary only that one-bit data be assigned to each cell. In carrying out the smoothing operation, however, data of a plurality of bits (i.e., multi-value data) are required in order to assign smoothing data modulating laser beam intensity to each cell.

In general, there are two methods for obtaining these smoothing data for the execution of the smoothing process. According to one method, the smoothing data are generated by inference from a dot pattern (i.e., one-bit (binary) map image) of a desired set of characters or figures. In the other method, the smoothing data are calculated from a vector image such as an outline font. Described in U.S. Pat. No. 4,847,641 is a method in which smoothing data are obtained by collating a bit map image with a template pattern.

The following is a description of a smoothing data generating method based on the template matching process.

A binary bit map image and a predetermined stored template or pattern are collated with each other for each sub-matrix in a bit map, whereby the presence of the characteristic of the previously selected bit map in the sub-matrix is detected. If this is done, then a characteristic pattern in the bit map image will be recognized from the sub-matrix so that a desired image will be able to be inferred therefrom. A modulating signal for a watched dot is settled in accordance with the difference between the desired image and the bit map image. The modulating signal is automatically generated every time the bit map image is found to be coincident with the template by collation. Thus, the print image quality is improved as bit map images are successively replaced with multi-value data so that the desired image is obtained.

Figure 9:
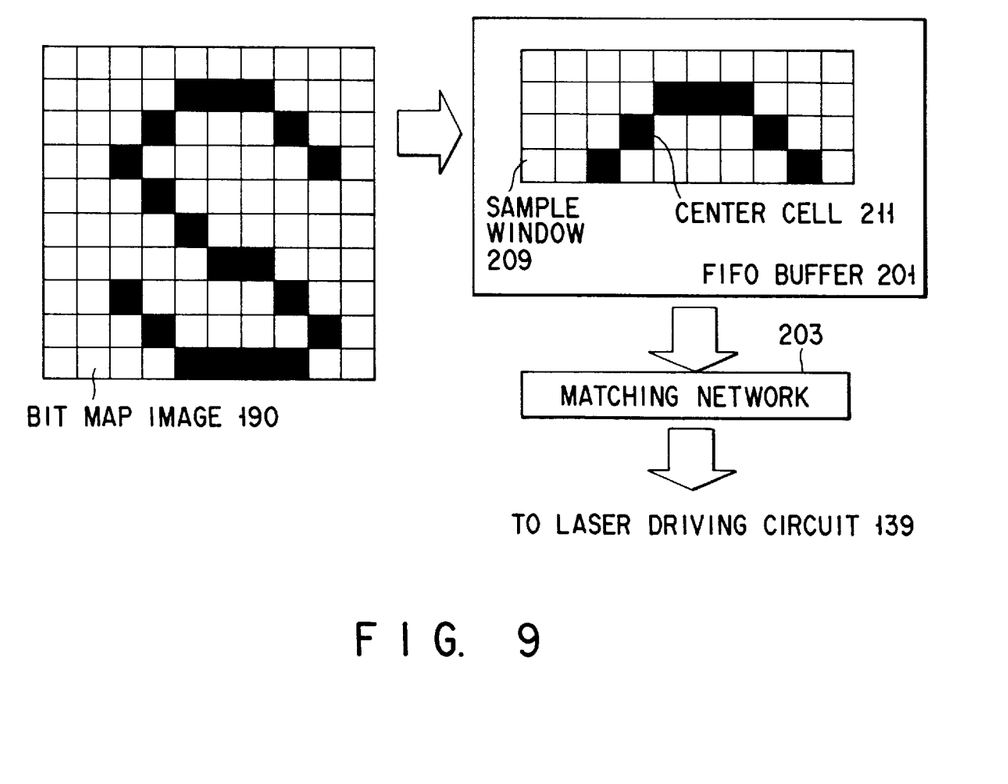
FIG. 9 is a diagram for illustrating a smoothing processing circuit shown in FIG. 7.

FIG. 9 is a conceptual block diagram of the smoothing processing circuit.

The collation with the template is carried out in the smoothing processing circuit 441 shown in FIG. 7. Data for a bit map image 190 generated by means of the character generator 411 are serialized and delivered to a first-in first-out (FIFO) data buffer 201. The serialized bit map image data 190 constitute an M-by-N sub-matrix (M=5 and N=3 for the case of FIG. 9), a sample window 209 which is obtained by partially cutting the bit map image in the FIFO buffer 201. The contents of the M-by-N sub-matrix gradually change as the serialized data are delivered one after another from the character generator 411. This indicates the movement of the sample window 209 on the original bit map image 190. M-by-N matrix data are passed through a matching network 203, whereupon it is matched with a plurality of template patterns prepared in advance. If the network 203 detects the coincidence between the data for the M-by-N sub-matrix and one or more templates, it replaces the bits covering the central portion of the M-by-N sub-matrix. If the coincidence is not found, the central bits appear unchanged at the output.

The smoothing data according to the present invention is a light intensity control signal and a pulse width control signal for the laser beam. If the coincidence with the template pattern(s) is detected, a signal is delivered to the laser driving circuit 139 such that a larger quantity of light than usual is emitted or a pluse width control signal is emitted if necessary.

The intensity data, which are empirically provided in the forms shown in FIG. 8, somewhat vary depending on the properties of the printer.

FIGS. 10A to 10E are conceptual diagrams illustrating a template pattern design. In the description to follow, the size of the sample window 209 is supposed to be given by M=7 and N=7. A template 465, which should have the same size as the window 209, is also expected to measure 7 by 7.

Figure 10A:
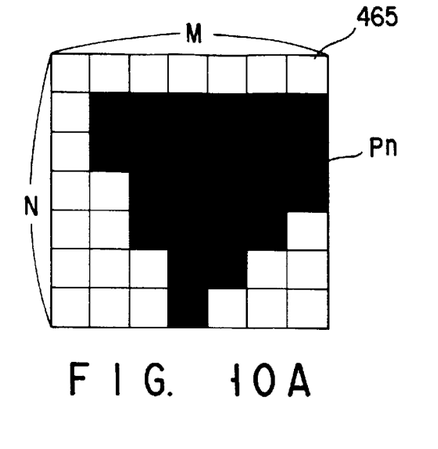
FIGS. 10A to 10E are diagrams illustrating the concept of a template pattern design.

FIG. 10A shows an example of the designed template pattern. If a bit pattern in the sample window 209 resembles this template pattern, a smoothing data shown in FIG. 8 is applied to an interest pixel Pn. Settlement of the smoothing data which is output of the interest pixel for this template pattern is the template pattern design.

Figure 10B:
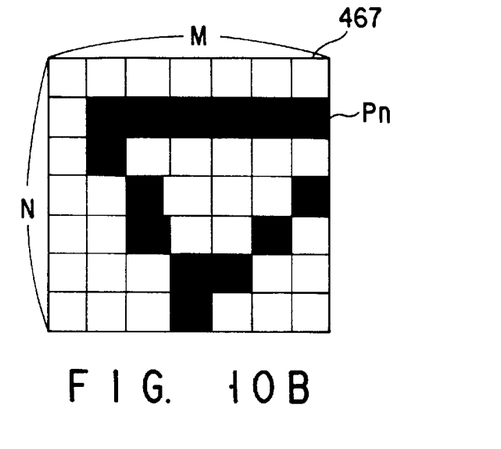
Figure 10C:
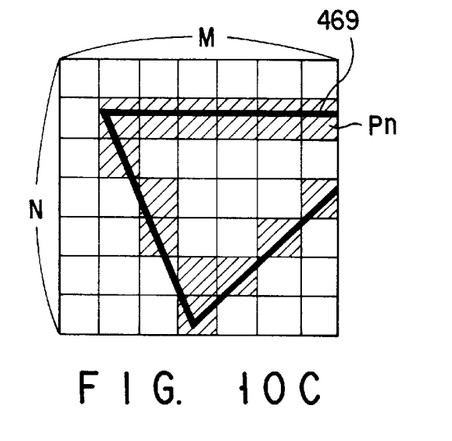
Figure 10D:
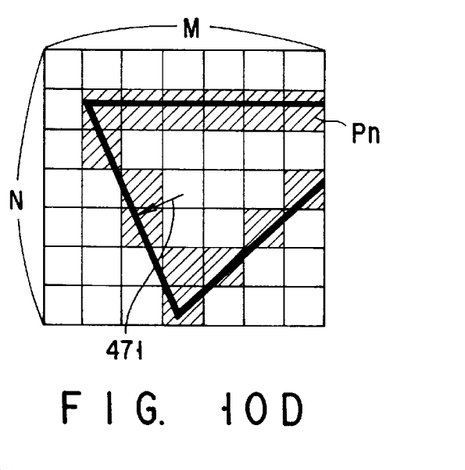
Figure 10E:
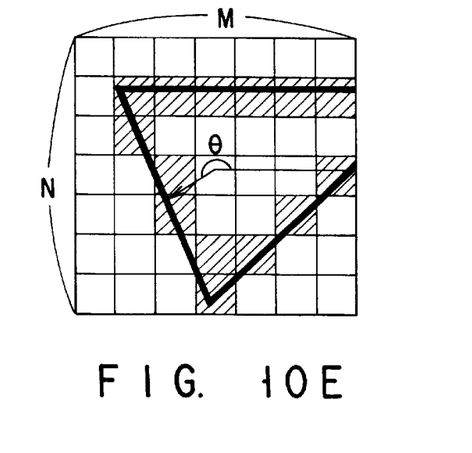

One template pattern of M×N representing binary bit map image is determined, as shown in FIG. 10A. Then, an outline dot pattern 467 of the pixels of the template pattern is extracted, as shown in FIG. 10B. The pattern extracted in FIG. 10B includes those dots which are on the border with the white pixels. In FIG. 10C, outline data 469 are obtained on the basis of the outline dot pattern. In this case, the data are obtained by the least squares method or the conventional curve fitting method using Bezie curves. Subsequently, a perpendicular line 471 is drawn to the outline nearest to the interest pixel, as shown in FIG. 10D. The length of the shortest perpendicular line 471 to the outline is represented as a distance $D_{min}$. As shown in FIG. 10E, moreover, the angle of inclination of the perpendicular line 471 to the horizontal direction is represented by $\theta$. Thus, the distance $D_{min}$ and the angle $\theta$ for a certain template pattern are settled.

Figure 11:
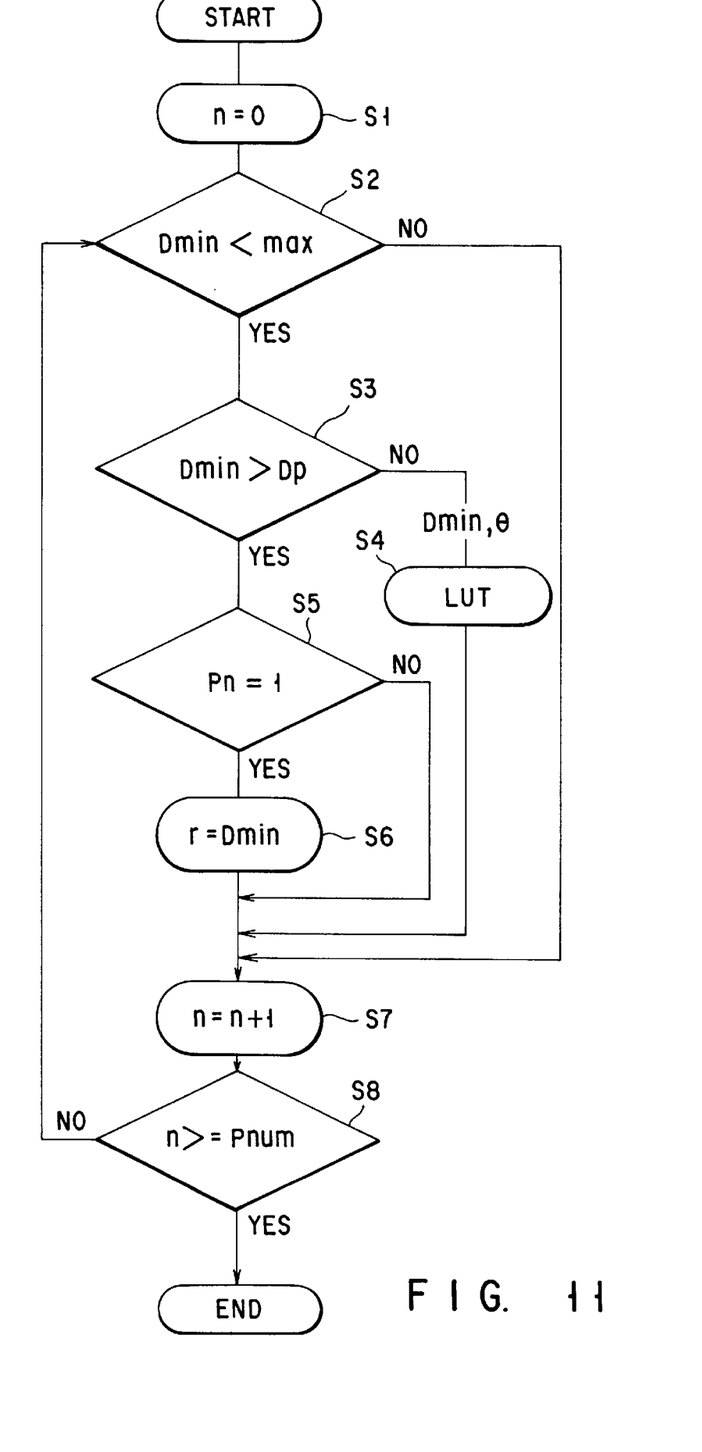
FIG. 11 is a flow chart used to establish the relationships between the length of the shortest perpendicular line to the outline, angle θ of inclination of the perpendicular line to the horizontal direction, and multi-value output of a interest pixel.

The relationships between the distance $D_{min}$, the angle $\theta$, and the multi-value output of the interest pixel are settled in accordance with the flow chart of FIG. 11.

The maximum dot radius the printer engine can provide by intensity modulation is represented by $r_{max}$. Since the radius $r_{max}$ depends greatly on the individual printer developing characteristics, these characteristics must be investigated in advance.

If the distance $D_{min}$ is greater than $r_{max}$, the output for the interest pixel Pn in the template 465 is used as normal intensity data (Step S2).

If it is concluded in Step S2 that the distance $D_{min}$ is smaller than $r_{max}$, it is further compared with a pixel density $D_p$ of the printer engine (Step S3). The pixel density $D_p$ is defined as a distance between dot centers of adjacent dots.

If it is concluded in Step S3 that the distance $D_{min}$ is greater than the pixel density $D_p$ and that the input binary data of the interest pixel Pn is a white pixel (Pn=0), the intensity data is 0. If the input binary data is a black pixel (Pn=1), intensity data such that the dot radius r of the interest pixel Pn is equal to the distance $D_{min}$ is delivered as an output value (Step S5 and Step S6). If it is concluded in Step S3 that the distance $D_{min}$ is not greater than the pixel density $D_p$, multi-value data are obtained with reference to a lookup table on the basis of the distance $D_{min}$ and the angle $\theta$ (Step S4).

Figure 12:
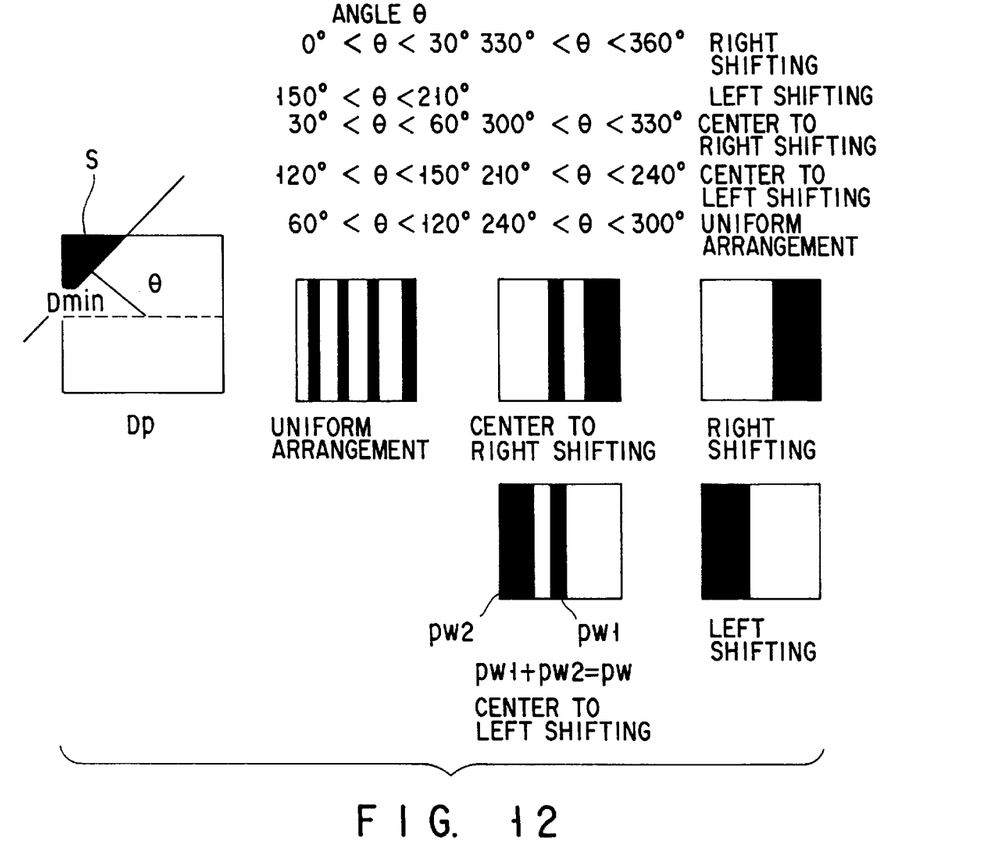
FIG. 12 is a diagram showing a method of settling an output sub-pixel pattern corresponding to the angle θ and the distance or length $D_{min}$ of the shortest perpendicular line to the outline in the case where the distance $D_{min}$ is smaller than a pixel density $D_p$ of a printer engine.

FIG. 12 shows a method of settling an output sub-pixel pattern corresponding to the angle $\theta$ and the distance $D_{min}$ in the case where the distance $D_{min}$ is smaller than the pixel density $D_p$.

First, an area S covered by the outline passing through the pixels is obtained from the distance $D_{min}$ and the angle $\theta$. A value obtained by dividing the passage area S by a pixel area $S_p$ ($D_P \times D_P$) is given as a total length pw (0<pw<1) of the pulse width. Based on the angle $\theta$, moreover, the pulse width pattern is divided in five, as shown in FIG. 12.

(1) Uniform arrangement is a pulse pattern obtained by uniformly dividing the overall pulse width in the pixel.

(2) In right (or left) shifting, pw is shifted to the right (or left).

(3) In center-to-right (or -left) shifting, an output is set such that pw1 and pw2 are given by pw1+pw2=pw and pw1:pw2=1:2, pw2 is recorded right (or left) side, and pw1 is recorded in the center of the pixel.

In the example described above, multi-value data 461 are generated by the template matching in the smoothing processing circuit 441. Alternatively, however, multi-value data 461 can be generated directly in the circuit 441 in a process such that the template design is simulated without using any template.

Figure 13:
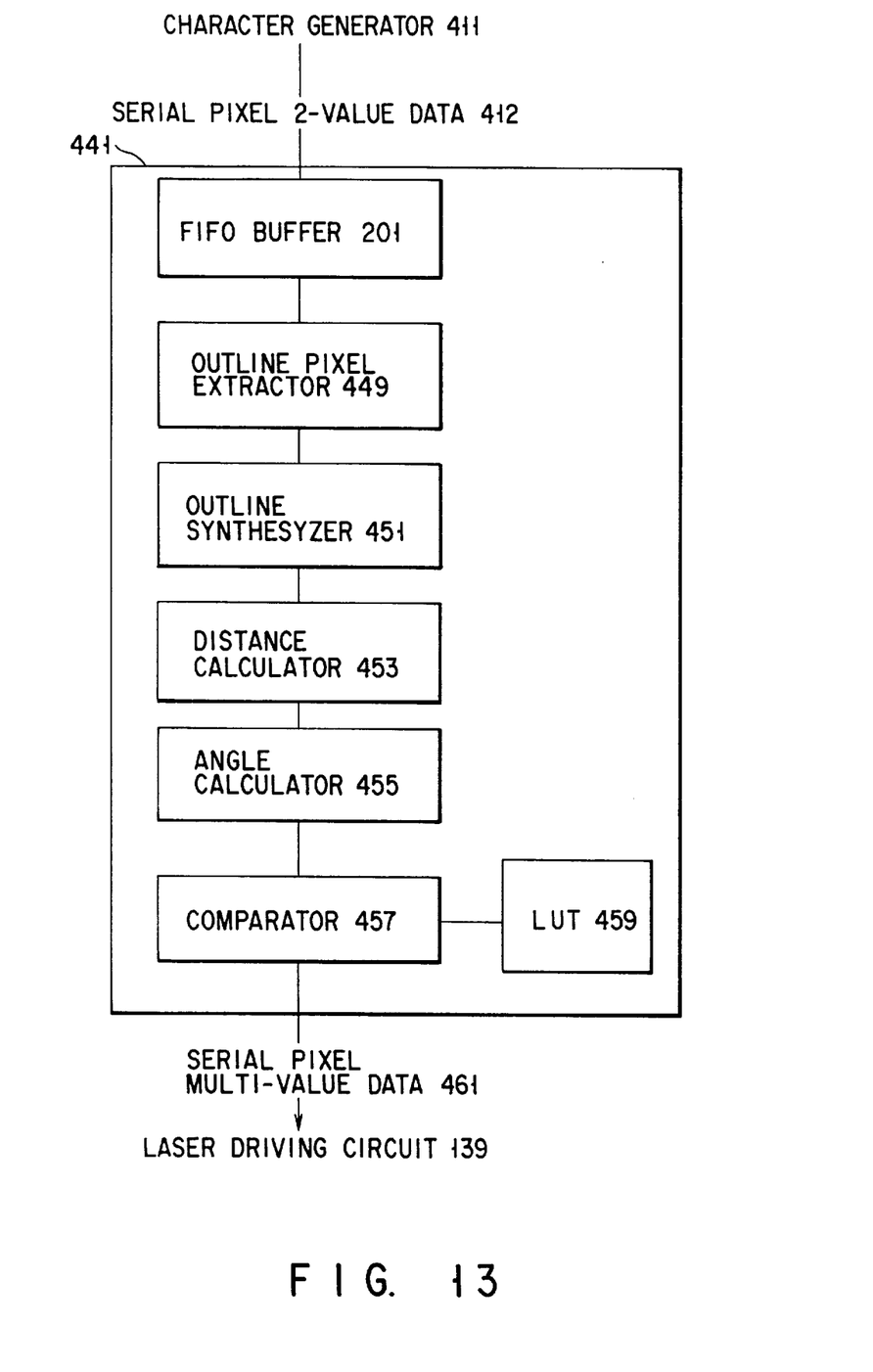
FIG. 13 is a diagram showing a configuration of the smoothing processing circuit for the case in which multi-value data are generated directly in the circuit without using any template.

FIG. 13 shows a configuration of the smoothing processing circuit 441 for this case.

Binary pixel data scanned along individual scanning lines are delivered serially from the character generator 411 to the smoothing processing circuit 441. The FIFO buffer 201 is stored with the serial data, and reconstructs the M-by-N small-piece bit map pattern 465 around the interest pixel Pn. An outline pixel extractor 449 extracts the outline edge pixels 467 from the stored FIFO buffer 201.

An outline synthesizer 451 synthesizes outline edge data 469 from the outline edge pixel data. If the output from the character generator 411 is an outline font, the data may be delivered directly to the outline synthesizer 451. A distance calculator 453 calculates distances D from the interest pixel to all of outline edges 469 in the M-by-N bit map pattern, and detects the minimum distance $D_{min}$ among these distances D. An angle calculator 455 calculates the angle $\theta$ of inclination of the perpendicular line 471 from the interest pixel Pn to the outline edge at the minimum distance $D_{min}$.

Based on the distance $D_{min}$ and the angle $\theta$, a comparator 457 creates the serial pixel multi-value data 461. Depending on the combination of the distance $D_{min}$ and the angle $\theta$, in this case, a lookup table 459 may be loaded with the serial pixel multi-value data 461 through the distance $D_{min}$ and the angle $\theta$.

The multi-value data can be directly created without using any template by this method.

Figure 14:
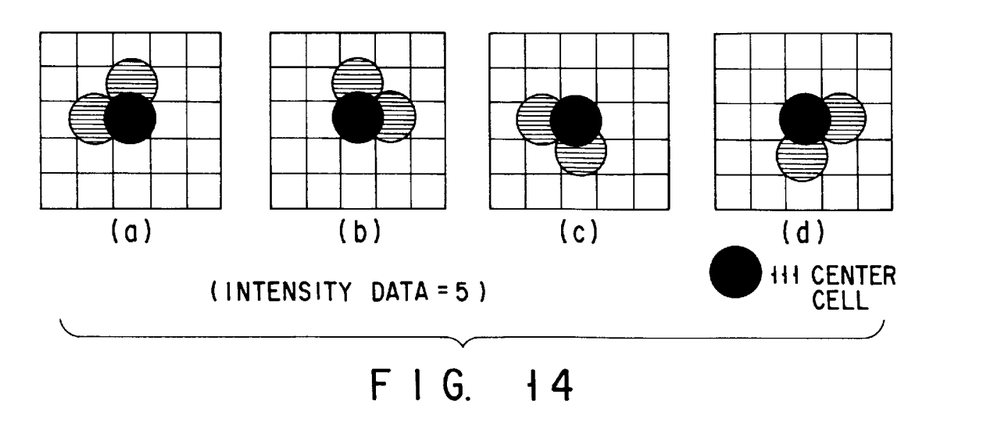
FIG. 14 is a diagram showing examples of template patterns.
Figure 15:
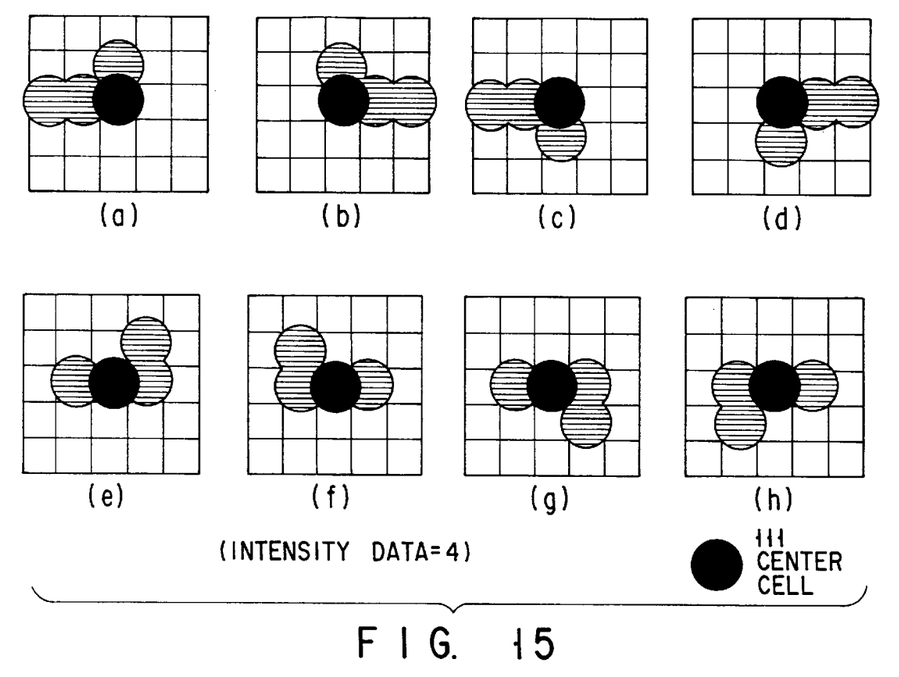
FIG. 15 is a diagram showing alternative examples of the template patterns.
Figure 16:
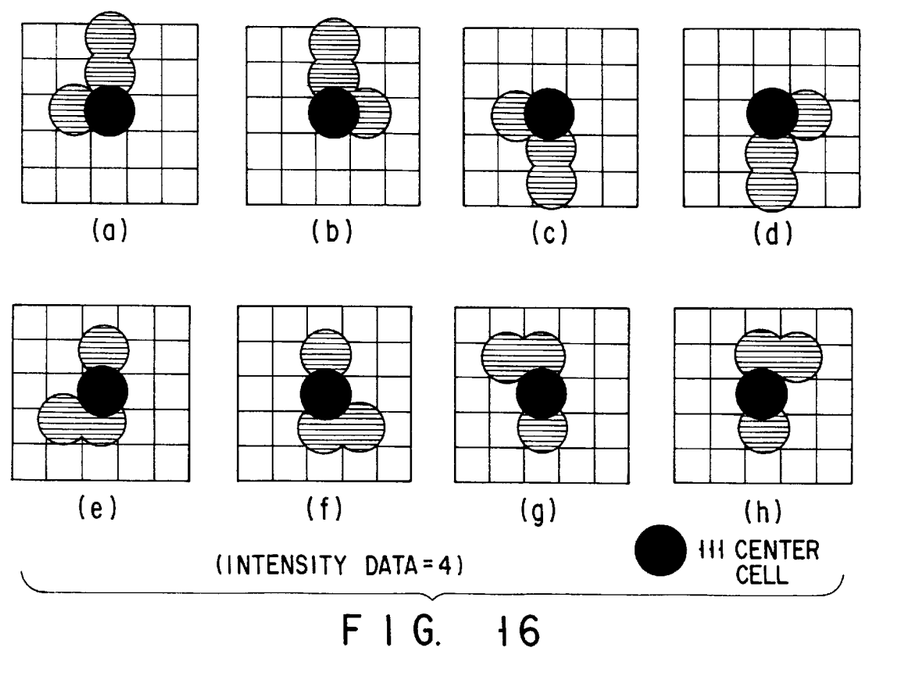
FIG. 16 is a diagram showing further examples of the template patterns.

Patterns such as the ones shown in FIGS. 14 to 16 may be provided as the template patterns.

FIG. 14 shows templates for matching with a 5-by-5 sample window containing the central pixels. When the sub-matrix coincides with a template such as the ones shown in FIG. 14, a light intensity modulating signal or intensity data p=5 is transmitted to the laser driving circuit (semiconductor laser control device) 139.

Likewise, when the bit map coincides with a template such as the ones shown in FIGS. 15 and 16, a light intensity modulating signal or intensity data p=4 is transmitted to the laser driving circuit 139.

The following is a description of a method of laser beam intensity modulation.

There are two known methods for modulating the laser beam intensity. According to one method, the quantity of light emitted from a semiconductor laser is modulated directly. In the other method, a laser beam with a given intensity emitted from a laser is modulated by being passed through a modulator.

(i) Direct Modulation Method

According to this method, the quantity of light emitted directly from the laser is modulated by controlling an electric current for driving the semiconductor laser beam.

As shown in FIG. 6, the laser driving circuit 139 includes the semiconductor laser 119, a DC driver 393 connected to the laser 119, a light-receiver 396 for monitoring the output light of the laser 119 and generating a monitor current Im, and an operational amplifier 392. The circuit 139 further includes a D/A converter 391 which converts a serial digital light intensity modulating signal delivered from the interface PCA 141 into a control signal Vc represented by an analog voltage.

The operational amplifier 392 receives at its inverting input the control signal Vc fed through a resistor Ri and a feedback current If based on the monitor current Im, and receives a reference signal Vr at its noninverting input. When the quantity of light emitted from the semiconductor laser 119 varies, the amplifier 392 generates an error signal Ve in response to the feedback current $I_f$, and applies it to the DC driver 393. This operation compensates the variation of the quantity of light emitted from the laser 119.

The light-receiver 396 detects part of the output light decomposed by means of a beam splitter 395, and converts the detected light quantity into the monitor current Im. The monitor current Im is compared with a control current Ii flowing through a resistive element Ri, and a voltage signal corresponding to the difference between these currents is generated as the error signal Ve.

The DC driver 393 serves to convert the voltage signal transmitted from the operational amplifier 392 into a driving current signal 397.

(ii) Light Modulator Method

Figure 17:
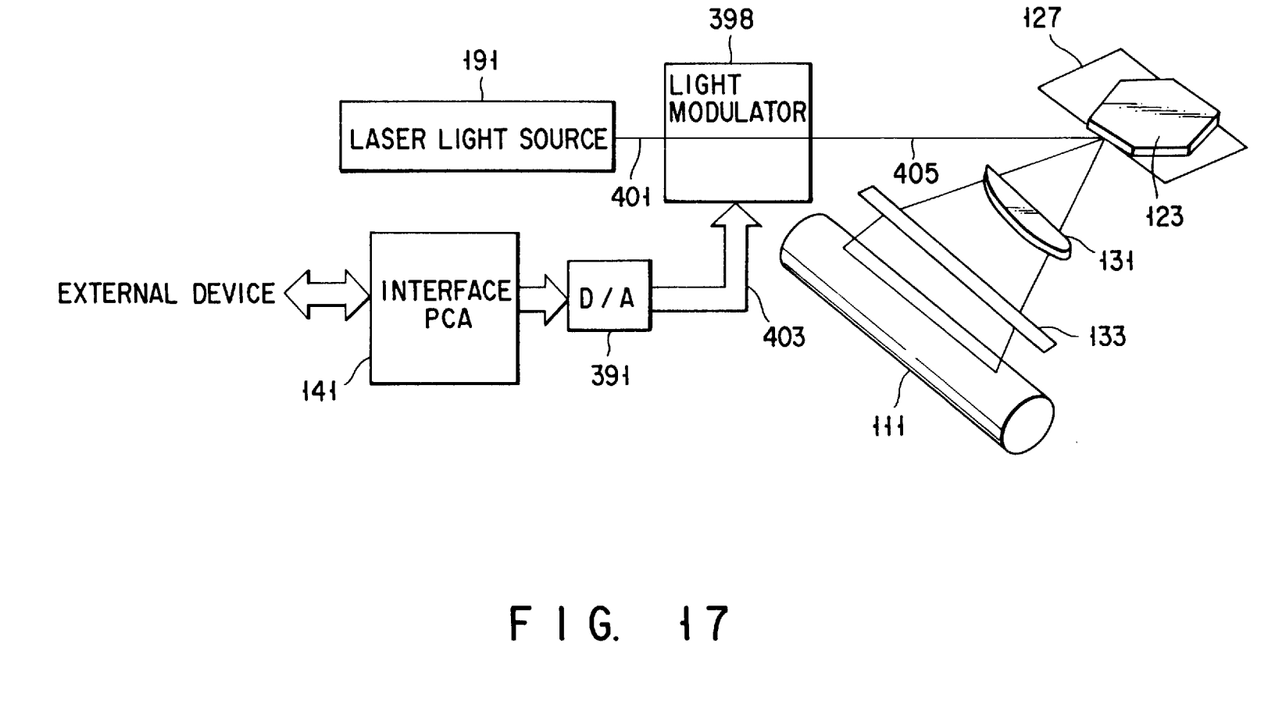
FIG. 17 is a diagram showing the principal part of an image forming apparatus according to a second embodiment of the invention.

FIG. 17 is a diagram for illustrating laser beam intensity modulation by means of an optical system and a light modulator used according to a second embodiment of the present invention.

A light modulator 398 receives a light 401 from a laser beam source 191, and controls the quantity of a transmitted light 405 in response to a modulating signal 403. A liquid crystal shutter is generally used as the modulator 398.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An image forming apparatus comprising:
    image forming means for forming an image from a plurality of first pixels each having a predetermined size, the first pixels being formed of a standard size at non-outline portions of forming the image; and
    smoothing processing means for executing a smoothing process by controlling the image forming means so that picture elements situated near the outline of the image formed by means of the image forming means are composed of second pixels having a size larger than that of the first pixels such that the second pixels are only formed at the outline of the image to execute the smoothing processing.

2. An image forming apparatus according to claim 1, wherein
    said image forming means includes means for forming one of the first and second pixels by means of a laser beam, and
    said smoothing processing means includes means for forming the second pixels by at least one of increasing the light quantity and modulating irradiation time for the laser beam as compared with the formation of the first pixels.

3. An image forming apparatus according to claim 2, wherein said smoothing processing means increases the light quantity of the laser beam by controlling the driving current of a laser for emitting the laser beam.

4. An image forming apparatus according to claim 2, wherein said smoothing processing means includes transmission quantity control means for controlling the quantity of transmission of the laser beam.

5. An image forming apparatus according to claim 4, wherein said transmission quantity control means includes a liquid crystal shutter.

6. An image forming apparatus according to claim 1, wherein said smoothing processing means includes means for controlling the image forming means to form the second pixels having a plurality of sizes larger than that of the first pixels.

7. An image forming apparatus according to claim 1, wherein said smoothing processing means includes a template pattern for matching with a bit map pattern of the image and means for outputting a smoothing signal when the template pattern is detected in the bit map pattern.

8. An image forming apparatus according to claim 7, wherein said smoothing processing means includes means for storing desired template patterns synthesized by a predetermined process and smoothing data corresponding to each of said desired template pattern for performing smoothing process of each of said desired template pattern.

9. An image forming apparatus according to claim 8, wherein
    said smoothing processing means further includes template pattern designing means for designing the template pattern, and
    said template pattern designing means includes means for designing a desired template pattern, means for extracting the outline of the desired template pattern, means for calculating the shortest distance from a interest pixel in the desired template pattern to the outline and an angle of inclination to a predetermined direction, and means for obtaining smoothing data on the basis of the shortest distance and the angle.

10. An image forming apparatus according to claim 1, wherein said smoothing processing means includes
    means for extracting outline pixels of an inputted binary image and synthesizing the outline of the image in accordance with the outline pixels,
    means for calculating the shortest distance from a predetermined pixel out of the binary pixels to the outline and an angle between the predetermined angle and a line connecting the predetermined pixel and the outline at the shortest distance, and
    smoothing data generating means for generating smoothing data on the basis of the shortest distance and the angle.

11. An image forming apparatus according to claim 10, wherein said smoothing data generating means includes
    laser beam intensity modulation data generating means for generating laser beam intensity modulation data for smoothing by intensity modulation of the laser beam,
    pulse dividing pattern data generating means for generating pulse dividing pattern data for smoothing by pulse division, distance comparing means for comparing said shortest distance with a pixel density, and smoothing data selecting means for selecting said laser beam intensity modulation data generating means in a case that said distance comparing means determines that the shortest distance is larger than the pixel density, and for selecting said pulse dividing pattern data generating means in a case that said distance comparing means determines that the shortest distance is smaller than the pixel density.

12. An image forming apparatus according to claim 11, wherein said pulse dividing pattern data generating means includes means for determining a total pulse width in a pixel on the basis of the shortest distance, and means for selecting a pulse dividing pattern among a plurality of pulse dividing patterns on the basis of the angle.

13. An image forming apparatus according to claim 10, wherein said pulse dividing pattern includes five kind of patterns of uniform dividing pattern, right shifting pattern, left shifting pattern, center-to-right shifting pattern and center-to-left shifting pattern, and said pulse dividing pattern data generating means includes means for selecting one of the uniform dividing pattern in a case that said angle is more than 60 degree and less than 120 degree, or more than 240 degree and less than 300 degree, the right shifting pattern in a case that said angle is more than 0 degree and less than 30 degree, or more than 330 degree and less than 360 degree, the left shifting pattern said angle is more than 150 degree and less than 210 degree, the center-to-right shifting pattern said angle is more than 30 degree and less than 60 degree, or more than 300 degree and less than 330 degree, and the center-to-left shifting pattern said angle is more than 120 degree and less than 150 degree, or more than 210 degree and less than 240 degree.

14. An image forming apparatus according to claim 11, wherein said pulse dividing pattern data generating means includes lookup table which is referred to output a divided pattern on the basis of the shortest distance and the angle.

15. An image forming apparatus according to claim 10, wherein said smoothing data generating means includes for outputting a smoothing data in reference to a lookup table on the basis of the shortest distance and the angle.

16. An electrophotographic recording apparatus comprising:

a photosensitive drum;

record means for recording an image thereon;

charging means for uniformly charging the photosensitive drum;

image forming means for forming an electrostatic latent image from first pixels having a predetermined size on the uniformly charged photosensitive drum, the first pixels being formed of a standard size at non-outline portions of forming the image;

smoothing processing means for executing a smoothing process such that picture elements situated near the outline of the electrostatic latent image formed by means of the image forming means are composed of second pixels having a size larger than that of the first pixels such that the second pixels are only formed at the outline of the image to execute the smoothing processing;

developing means for developing the smoothed electrostatic latent image to form a predetermined image;

transfer means for transferring the image to the record means; and fixing means for fixing the transferred image on the record means.

17. An electrophotographic recording apparatus according to claim 16, wherein said image forming means includes means for forming at least one of the first and second pixels by means of a laser beam, and said smoothing processing means includes means for forming the second pixels by increasing one of the light quantity and irradiation time for the laser beam as compared with the formation of the first pixels.

18. An electrophotographic recording apparatus according to claim 16, wherein said smoothing processing means includes means for controlling the image forming means to form the second pixels having a plurality of sizes larger than that of the first pixels.

19. An electrophotographic recording apparatus according to claim 16, wherein said smoothing processing means includes at least one template pattern for matching with a bit map pattern of the image and means for outputting a smoothing signal when the template pattern is detected in the bit map pattern.

20. An image forming method comprising steps of:

a first step of forming an image from a plurality of first pixels each having a predetermined size, the first pixels being formed of a standard size at non-outline portions of forming the image; and a second step of executing a smoothing process so that picture elements situated near or on the outline of the image formed are composed of second pixels having a size larger than that of the first pixels such that the second pixels are only formed at the outline of the image to execute the smoothing processing.

21. An image forming method according to claim 20, wherein said second step includes the substeps of:

extracting outline pixels of an inputted binary image and synthesizing the outline of the image in accordance with the outline pixels, calculating the shortest distance from a predetermined pixel out of the binary pixels to the outline and an angle between the predetermined angle and a line connecting the predetermined pixel and the outline at the shortest distance, and generating smoothing data on the basis of the shortest distance and the angle.

22. An image forming method according to claim 20, wherein said second step includes the substeps of:

designing a desired template pattern, extracting the outline of the desired template pattern, calculating the shortest distance from a interest pixel in the desired template pattern to the outline and an angle of inclination to a predetermined direction, obtaining smoothing data on the basis of the shortest distance and the angle, and storing desired template patterns synthesized by a predetermined process and smoothing data corresponding to each of said desired template pattern for performing smoothing process of each of said desired template pattern.

* * * * *